United States Patent
Kim et al.

(10) Patent No.: US 11,074,480 B2
(45) Date of Patent: Jul. 27, 2021

(54) LEARNING METHOD AND LEARNING DEVICE FOR SUPPORTING REINFORCEMENT LEARNING BY USING HUMAN DRIVING DATA AS TRAINING DATA TO THEREBY PERFORM PERSONALIZED PATH PLANNING

(71) Applicant: Stradvision, Inc., Pohang-si (KR)

(72) Inventors: Kye-Hyeon Kim, Seoul (KR); Yongjoong Kim, Pohang-si (KR); Hak-Kyoung Kim, Pohang-si (KR); Woonhyun Nam, Pohang-si (KR); SukHoon Boo, Anyang-si (KR); Myungchul Sung, Pohang-si (KR); Dongsoo Shin, Suwon-si (KR); Donghun Yeo, Pohang-si (KR); Wooju Ryu, Pohang-si (KR); Myeong-Chun Lee, Pohang-si (KR); Hyungsoo Lee, Seoul (KR); Taewoong Jang, Seoul (KR); Kyungjoong Jeong, Pohang-si (KR); Hongmo Je, Pohang-si (KR); Hojin Cho, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

(21) Appl. No.: 16/740,135

(22) Filed: Jan. 10, 2020

(65) Prior Publication Data
US 2020/0250486 A1   Aug. 6, 2020

Related U.S. Application Data

(60) Provisional application No. 62/799,368, filed on Jan. 31, 2019.

(51) Int. Cl.
*G06K 9/62* (2006.01)
*G05D 1/00* (2006.01)
(Continued)

(52) U.S. Cl.
CPC ......... *G06K 9/6262* (2013.01); *G05D 1/0088* (2013.01); *G05D 1/0221* (2013.01);
(Continued)

(58) Field of Classification Search
CPC .. G06K 9/6262; G05D 1/0088; G05D 1/0221; G05D 2201/0213; G06T 15/20; G06T 17/05
See application file for complete search history.

(56) References Cited

U.S. PATENT DOCUMENTS

| 2019/0258938 A1* | 8/2019 | Mnih | G06N 3/006 |
| 2019/0266489 A1* | 8/2019 | Hu | B60W 50/00 |
| 2020/0027560 A1* | 1/2020 | Ling | G16H 10/60 |

FOREIGN PATENT DOCUMENTS

WO   2018/211140 A1   11/2018

OTHER PUBLICATIONS

Duc Thien Nguyen, Akshar Kumar, Hoong Chuin Lau, "Credit Assignment For Collective Multiagent RL with Global Rewards", 32nd conference on neural information processing systems (NeurIPS 2018), pp. 1-12 (Year: 2018).*

(Continued)

*Primary Examiner* — Kakali Chaki
*Assistant Examiner* — Vasyl Dykyy
(74) *Attorney, Agent, or Firm* — Kaplan Breyer Schwarz, LLP

(57) ABSTRACT

A learning method for acquiring at least one personalized reward function, used for performing a Reinforcement Learning (RL) algorithm, corresponding to a personalized optimal policy for a subject driver is provided. And the method includes steps of: (a) a learning device performing a process of instructing an adjustment reward network to generate first adjustment rewards, by referring to the information on actual actions and actual circumstance vectors in (Continued)

driving trajectories, a process of instructing a common reward module to generate first common rewards by referring to the actual actions and the actual circumstance vectors, and a process of instructing an estimation network to generate actual prospective values by referring to the actual circumstance vectors; and (b) the learning device instructing a first loss layer to generate an adjustment reward and to perform backpropagation to learn parameters of the adjustment reward network.

18 Claims, 3 Drawing Sheets

(51) Int. Cl.
  *G05D 1/02* (2020.01)
  *G06T 15/20* (2011.01)
  *G06T 17/05* (2011.01)
(52) U.S. Cl.
  CPC .............. *G06T 15/20* (2013.01); *G06T 17/05* (2013.01); *G05D 2201/0213* (2013.01)

(56) References Cited

OTHER PUBLICATIONS

Extended European Search Report issued in counterpart European patent application No. 20152797.5, dated Apr. 8, 2020, 9 pp.

\* cited by examiner

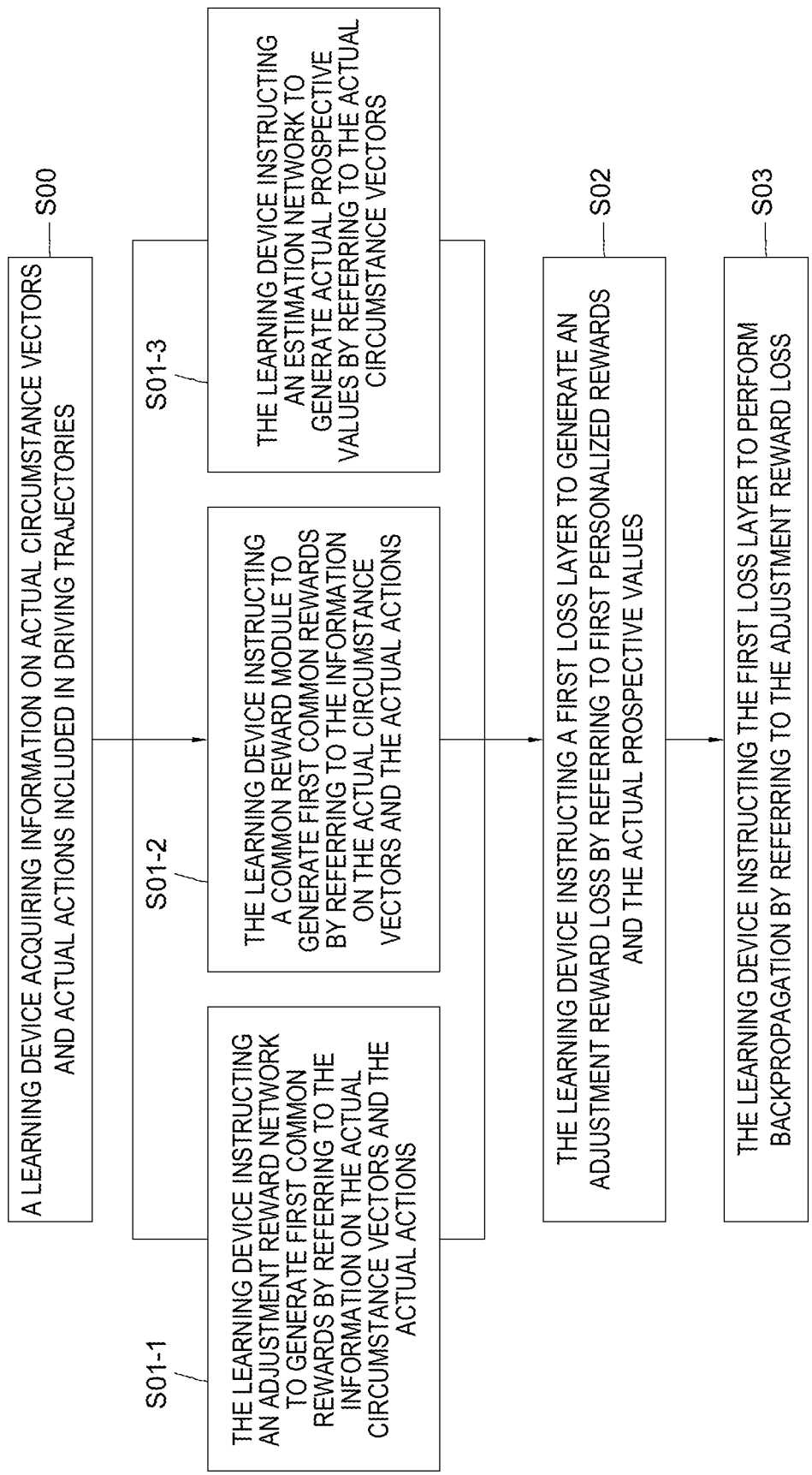

LEARNING METHOD AND LEARNING DEVICE FOR SUPPORTING REINFORCEMENT LEARNING BY USING HUMAN DRIVING DATA AS TRAINING DATA TO THEREBY PERFORM PERSONALIZED PATH PLANNING

CROSS REFERENCE OF RELATED APPLICATION

This present application claims the benefit of the earlier filing date of provisional patent application No. 62/799,368, filed Jan. 31, 2019, the entire contents of which being incorporated herein by reference.

FIELD OF THE DISCLOSURE

The present disclosure relates to a learning method and a learning device for use with an autonomous vehicle; and more particularly, to the learning method and the learning device for supporting a Reinforcement Learning (RL) by using human driving data as training data, to thereby perform a personalized path planning, and a testing method and a testing device using the same.

BACKGROUND OF THE DISCLOSURE

An autonomous driving is performed to transport its passengers safely and quickly. However, sometimes, when a path planning is performed, what the autonomous driving endeavors to achieve and what the passengers want may be different.

For example, some of the passengers may want a comfortable driving experience without a sudden stop or a sudden acceleration, rather than a quick but unstable driving experience. In this case, if the path planning performed by an autonomous vehicle carrying said some of the passengers allows the autonomous vehicle to drive quickly but not stably, said some of the passengers may be dissatisfied with an autonomous driving performed by the autonomous vehicle.

Thus, it is important to personalize the path planning passenger by passenger, but it has not been studied much so far.

SUMMARY OF THE DISCLOSURE

It is an object of the present disclosure to solve all the aforementioned problems.

It is another object of the present disclosure to provide a learning method for supporting a Reinforcement Learning (RL) algorithm by using human driving data as training data, to thereby provide a personalized path planning, and then to thereby provide a satisfied driving experience to passengers of an autonomous vehicle.

It is still another object of the present disclosure to provide a personalized reward function to be used for supporting the RL algorithm, by using the human driving data as the training data, to thereby provide the personalized path planning.

It is still yet another object of the present disclosure to provide a method for acquiring the personalized reward function by adjusting a common reward function to reduce usage of computing resources.

In accordance with one aspect of the present disclosure, there is provided a learning method for acquiring at least one personalized reward function, used for performing a Reinforcement Learning (RL) algorithm, corresponding to a personalized optimal policy for a subject driver which is acquired by adjusting a common optimal policy established according to a common criterion for an autonomous driving, to thereby support the autonomous driving of a subject vehicle, including steps of: (a) a learning device, if one or more actual circumstance vectors and information on one or more actual actions performed at timings corresponding to the actual circumstance vectors by referring to one or more actual circumstances, corresponding thereto, included in each of one or more driving trajectories of the subject driver are acquired, performing (i) a process of instructing an adjustment reward network, which is built to operate as an adjustment reward function to be used for establishing the personalized reward function from a common reward function corresponding to the common optimal policy, to generate each of one or more first adjustment rewards corresponding to each of the actual actions performed at each of the timings, by referring to the information on the actual actions and the actual circumstance vectors, (ii) a process of instructing a common reward module corresponding to the common reward function to generate each of one or more first common rewards corresponding to each of the actual actions performed at each of the timings, by referring to the information on the actual actions and the actual circumstance vectors, and (iii) a process of instructing an estimation network, which is capable of estimating sums of personalized rewards generated while common optimal actions according to the common optimal policy are performed based on its corresponding actual circumstances, to generate each of one or more actual prospective values corresponding to each of the actual circumstances at each of the timings in the driving trajectories, by referring to the actual circumstance vectors; and (b) the learning device instructing a first loss layer to generate at least one adjustment reward loss by referring to (i) each of first personalized rewards corresponding to each of the first adjustment rewards and each of the first common rewards and (ii) the actual prospective values, and to perform backpropagation by referring to the adjustment reward loss, to thereby learn at least part of parameters of the adjustment reward network.

As one example, at the step of (b), the learning device instructs the first loss layer to generate the adjustment reward loss by referring to a following formula:

$$E(R_{driver}) = \sum_{\mathcal{T}_1,\mathcal{T}_2,\ldots,\mathcal{T}_N} \sum_{t=0}^{T-1} \max\Bigg(0,\ V_{common}(s_t) - $$

$$\sum_{r=t}^{T-1} \gamma^{r-t}(R_{common}(s_r, a_r, s_{r+1}) + R_{driver}(s_r, a_r, s_{r+1}))\Bigg) + $$

$$\alpha \sum_{\mathcal{T}_1,\mathcal{T}_2,\ldots,\mathcal{T}_N} \sum_{t=0}^{T-1} |R_{driver}(s_r, a_r, s_{r+1})|$$

wherein $\mathcal{T}_1, \mathcal{T}_2, \ldots, \mathcal{T}_N$ denote a first driving trajectory to an N-th driving trajectory in the driving trajectories, $V_{common}(s_t)$ denotes a specific actual prospective value, among the actual prospective values, corresponding to a sum of personalized rewards generated while the common optimal actions according to the common optimal policy are performed from a t-th timing to a final timing of a specific driving trajectory among the driving trajectories, is this an $R_{common}(s_r, a_r, s_{r+1}) + R_{driver}(s_r, a_r, s_{r+1})$ denotes a first specific personalized reward, among the first personalized rewards, corresponding to an r-th timing same as or after the t-th timing in the specific driving trajectory, $\Sigma_{t=0}^{T-1}|R_{driver}(s_t, a_t, s_{t+1})|$ denotes a sum of absolute values of first specific adjustment rewards, among the first adjustment rewards, generated during a time range from an initial timing to the final timing of the specific driving trajectory, and $\gamma$ and $\alpha$ denote prescribed constants.

As one example, the method further includes steps of: (c) the learning device performing (i) a process of instructing the adjustment reward network to generate one or more second adjustment rewards corresponding to each of the common optimal actions to be performed at each of the timings of the driving trajectories by referring to the actual circumstance vectors, (ii) a process of instructing the common reward module to generate one or more second common rewards corresponding to each of the common optimal actions to be performed at each of the timings of the driving trajectories by referring to the actual circumstance vectors, and (iii) a process of instructing the estimation network, by referring to each of one or more virtual circumstance vectors corresponding to each of virtual circumstances caused by performing the common optimal actions at each of the timings of the driving trajectories, to generate one or more virtual prospective values corresponding to the virtual circumstances; and (d) the learning device instructing a second loss layer to generate at least one estimation loss by referring to (i) each of second personalized rewards corresponding to each of the second adjustment rewards and each of the second common rewards, (ii) the virtual prospective values and (iii) the actual prospective values, and to perform backpropagation by referring to the estimation loss, to thereby learn at least part of parameters of the estimation network.

As one example, at the step of (d), the learning device instructs the second loss layer to generate the estimation loss by referring to a following formula:

$$E(V_{common}) = \sum_{\mathcal{T}_1, \mathcal{T}_2, \ldots, \mathcal{T}_N} \sum_{t=1}^{T-1} (R_{common}(s_t, a'_t, s'_{t+1}) + R_{driver}(s_t, a'_t, s'_{t+1}) + \gamma V_{common}(s'_{t+1}) - V_{common}(s_t))^2$$

$\mathcal{T}_1, \mathcal{T}_2, \ldots, \mathcal{T}_N$ denote a first driving trajectory to an N-th driving trajectory in the driving trajectories, $V_{common}(s_t)$ denotes a specific actual prospective value, among the actual prospective values, corresponding to a sum of personalized rewards generated while the common optimal actions according to the common optimal policy are performed from a t-th timing to a final timing of a specific driving trajectory among the driving trajectories, $V_{common}(s'_{t+1})$ denotes a specific virtual prospective value, among the virtual prospective values, corresponding to a sum of personalized rewards generated while the common optimal actions according thereto are performed from a (t+1)-th timing to the final timing based on a specific virtual circumstance caused by performing one of the common optimal actions at the t-th timing, $R_{common}(s_t, a'_t, s'_{t+1}) + R_{driver}(s_t, a'_t, s'_{t+1})$ denotes a second specific personalized reward, among the second personalized rewards, corresponding to the t-th timing, and $\gamma$ denotes a prescribed constant.

As one example, the virtual circumstance vectors are acquired by applying a circumstance estimation operation to each of at least part of the actual circumstance vectors and its corresponding common optimal action corresponding to the common optimal policy, wherein the circumstance estimation operation is performed by a pre-trained circumstance expectation network or performed by (i) instructing a virtual world simulator to simulate a specific actual circumstance corresponding to a specific actual circumstance vector in a virtual world, (ii) instructing a virtual vehicle in the specific actual circumstance to perform one of the common optimal actions according to the common optimal policy, and (iii) detecting changes of the virtual world caused by said one of the common optimal actions.

As one example, the learning device repeats a process of training the adjustment reward network corresponding to the step of (a) and the step of (b) and a process of training the estimation network corresponding to the step of (c) and the step of (d), to thereby fully train the adjustment reward network and the estimation network.

As one example, the driving trajectories are provided to the learning device as a mini batch generated by randomly sampling the driving trajectories from a driving trajectory group corresponding to the subject driver.

As one example, the common optimal actions according to the common optimal policy are determined by a general RL agent optimized by performing the RL algorithm using the common reward module corresponding to the common optimal policy.

In accordance with another aspect of the present disclosure, there is provided a testing method for using at least one personalized reward function to train a personalized Reinforcement Learning (RL) agent, corresponding to a personalized optimal policy for a subject driver which is acquired by adjusting a common optimal policy established according to a common criterion for an autonomous driving, to thereby support the autonomous driving of a subject vehicle, including steps of: (a) on condition that (1) a learning device, if one or more actual circumstance vectors for training and information on one or more actual actions for training performed at timings for training corresponding to the actual circumstance vectors for training by referring to one or more actual circumstances for training, corresponding thereto, included in each of one or more driving trajectories for training of the subject driver are acquired, has performed (i) a process of instructing an adjustment reward network, which is built to operate as an adjustment reward function to be used for establishing the personalized reward function from a common reward function corresponding to the common optimal policy, to generate each of one or more first adjustment rewards for training corresponding to each of the actual actions for training performed at each of the timings for training, by referring to the information on the actual actions for training and the actual circumstance vectors for training, (ii) a process of instructing a common reward module corresponding to the common reward function to generate each of one or more first common rewards for training corresponding to each of the actual actions for training performed at each of the timings for training, by referring to the information on the actual actions for training and the actual circumstance vectors for training, and (iii) a process of instructing an estimation network, which is capable of estimating sums of personalized rewards for training generated while common optimal actions for training according to the common optimal policy for training are performed based on its corresponding actual circumstances for training, to generate each of one or more actual prospective values for training corresponding to each of the actual circumstances for training at each of the timings for training in the driving trajectories for training, by referring to the actual circumstance vectors for training; and (2) the learning device has instructed a first loss layer to generate at least one adjustment reward loss by referring to (i) each of first personalized rewards for training corresponding to each of the first adjustment rewards for training and each of the first common rewards for training and (ii) the actual prospective values for training, and to perform backpropagation by referring to the adjustment reward loss, to thereby learn at least part of parameters of the adjustment reward network, a testing device instructing the adjustment reward network and the common reward module to generate a personalized reward for testing including an adjustment reward for testing and a common reward for testing by referring to (i) an actual circumstance vector for testing corresponding to a t-th timing and (ii) an actual action for testing generated by the personalized RL agent; (b) the testing device instructing the personalized RL agent to train its own parameters by referring to the personalized reward for testing.

As one example, at the step of (b), the personalized RL agent trains said its own parameters by referring to the personalized reward for testing, to thereby support the subject vehicle to drive similarly to the actual actions for training.

In accordance with still another aspect of the present disclosure, there is provided a learning device for acquiring at least one personalized reward function, used for performing a Reinforcement Learning (RL) algorithm, corresponding to a personalized optimal policy for a subject driver which is acquired by adjusting a common optimal policy established according to a common criterion for an autonomous driving, to thereby support the autonomous driving of a subject vehicle, including: at least one memory that stores instructions; and at least one processor configured to execute the instructions to perform processes of: (I) if one or more actual circumstance vectors and information on one or more actual actions performed at timings corresponding to the actual circumstance vectors by referring to one or more actual circumstances, corresponding thereto, included in each of one or more driving trajectories of the subject driver are acquired, performing (i) a process of instructing an adjustment reward network, which is built to operate as an adjustment reward function to be used for establishing the personalized reward function from a common reward function corresponding to the common optimal policy, to generate each of one or more first adjustment rewards corresponding to each of the actual actions performed at each of the timings, by referring to the information on the actual actions and the actual circumstance vectors, (ii) a process of instructing a common reward module corresponding to the common reward function to generate each of one or more first common rewards corresponding to each of the actual actions performed at each of the timings, by referring to the information on the actual actions and the actual circumstance vectors, and (iii) a process of instructing an estimation network, which is capable of estimating sums of personalized rewards generated while common optimal actions according to the common optimal policy are performed based on its corresponding actual circumstances, to generate each of one or more actual prospective values corresponding to each of the actual circumstances at each of the timings in the driving trajectories, by referring to the actual circumstance vectors; and (II) instructing a first loss layer to generate at least one adjustment reward loss by referring to (i) each of first personalized rewards corresponding to each of the first adjustment rewards and each of the first common rewards and (ii) the actual prospective values, and to perform backpropagation by referring to the adjustment reward loss, to thereby learn at least part of parameters of the adjustment reward network.

As one example, at the process of (II), the processor instructs the first loss layer to generate the adjustment reward loss by referring to a following formula:

$$E(R_{driver}) = \sum_{\mathcal{T}_1, \mathcal{T}_2, \ldots, \mathcal{T}_N} \sum_{t=0}^{T-1} \max\left(0, V_{common}(s_t) - \sum_{r=t}^{T-1} \gamma^{r-t}(R_{common}(s_r, a_r, s_{r+1}) + R_{driver}(s_r, a_r, s_{r+1}))\right) + \alpha \sum_{\mathcal{T}_1, \mathcal{T}_2, \ldots, \mathcal{T}_N} \sum_{t=0}^{T-1} |R_{driver}(s_r, a_r, s_{r+1})|$$

wherein $\mathcal{T}_1, \mathcal{T}_2, \ldots, \mathcal{T}_N$ denote a first driving trajectory to an N-th driving trajectory in the driving trajectories, $V_{common}(s_t)$ denotes a specific actual prospective value, among the actual prospective values, corresponding to a sum of personalized rewards generated while the common optimal actions according to the common optimal policy are performed from a t-th timing to a final timing of a specific driving trajectory among the driving trajectories, $R_{common}(s_r, a_r, s_{r+1}) + R_{driver}(s_r, a_r, s_{r+1})$ denotes a first specific personalized reward, among the first personalized rewards, corresponding to an r-th timing same as or after the t-th timing in the specific driving trajectory, $\Sigma_{t=0}^{T-1} |R_{driver}(s_r, a_r, s_{r+1})|$ denotes a sum of absolute values of first specific adjustment rewards, among the first adjustment rewards, generated during a time range from initial timing to the final timing of the specific driving trajectory, and $\gamma$ and $\alpha$ denote prescribed constants.

As one example, wherein the processor further performs a process of: (III) performing (i) a process of instructing the adjustment reward network to generate one or more second adjustment rewards corresponding to each of the common optimal actions to be performed at each of the timings of the driving trajectories by referring to the actual circumstance vectors, (ii) a process of instructing the common reward module to generate one or more second common rewards corresponding to each of the common optimal actions to be performed at each of the timings of the driving trajectories by referring to the actual circumstance vectors, and (iii) a process of instructing the estimation network, by referring to each of one or more virtual circumstance vectors corresponding to each of virtual circumstances caused by performing the common optimal actions at each of the timings of the driving trajectories, to generate one or more virtual prospective values corresponding to the virtual circumstances; and (IV) instructing a second loss layer to generate at least one estimation loss by referring to (i) each of second personalized rewards corresponding to each of the second adjustment rewards and each of the second common rewards, (ii) the virtual prospective values and (iii) the actual prospective values, and to perform backpropagation by referring to the estimation loss, to thereby learn at least part of parameters of the estimation network.

As one example, at the process of (IV), the processor instructs the second loss layer to generate the estimation loss by referring to a following formula:

$$E(V_{common}) = \sum_{\mathcal{T}_1, \mathcal{T}_2, \ldots, \mathcal{T}_N} \sum_{t=1}^{T-1} (R_{common}(s_t, a'_t, s'_{t+1}) +$$
$$R_{driver}(s_t, a'_t, s'_{t+1}) + \gamma V_{common}(s'_{t+1}) - V_{common}(s_t))^2$$

wherein $\mathcal{T}_1, \mathcal{T}_2, \ldots, \mathcal{T}_N$ denote a first driving trajectory to an N-th driving trajectory in the driving trajectories, $V_{common}(s_t)$ denotes a specific actual prospective value, among the actual prospective values, corresponding to a sum of personalized rewards generated while the common optimal actions according to the common optimal policy are performed from a t-th timing to a final timing of a specific driving trajectory among the driving trajectories, $V_{common}(s'_{t+1})$ denotes a specific virtual prospective value, among the virtual prospective values, corresponding to a sum of personalized rewards generated while the common optimal actions according thereto are performed from a (t+1)-th timing to the final timing based on a specific virtual circumstance caused by performing one of the common optimal actions at the t-th timing, $R_{common}(s_t, a'_t, s'_{t+1}) + R_{driver}(s_t, a'_t, s'_{t+1})$ denotes a second specific personalized reward, among the second personalized rewards, corresponding to the t-th timing, and $\gamma$ denotes a prescribed constant.

As one example, the virtual circumstance vectors are acquired by applying a circumstance estimation operation to each of at least part of the actual circumstance vectors and its corresponding common optimal action corresponding to the common optimal policy, wherein the circumstance estimation operation is performed by a pre-trained circumstance expectation network or performed by (i) instructing a virtual world simulator to simulate a specific actual circumstance corresponding to a specific actual circumstance vector in a virtual world, (ii) instructing a virtual vehicle in the specific actual circumstance to perform one of the common optimal actions according to the common optimal policy, and (iii) detecting changes of the virtual world caused by said one of the common optimal actions.

As one example, the processor repeats a process of training the adjustment reward network corresponding to the process of (I) and the process of (II) and a process of training the estimation network corresponding to the process of (III) and the process of (IV), to thereby fully train the adjustment reward network and the estimation network.

As one example, the driving trajectories are provided to the learning device as a mini batch generated by randomly sampling the driving trajectories from a driving trajectory group corresponding to the subject driver.

As one example, the common optimal actions according to the common optimal policy are determined by a general RL agent optimized by performing the RL algorithm using the common reward module corresponding to the common optimal policy.

In accordance with still yet another aspect of the present disclosure, there is provided a testing device for using at least one personalized reward function to train a personalized Reinforcement Learning (RL) agent, corresponding to a personalized optimal policy for a subject driver which is acquired by adjusting a common optimal policy established according to a common criterion for an autonomous driving, to thereby support the autonomous driving of a subject vehicle, including: at least one memory that stores instructions; and at least one processor configured to execute the instructions to perform processes of: (I) on condition that (1) a learning device, if one or more actual circumstance vectors for training and information on one or more actual actions for training performed at timings for training corresponding to the actual circumstance vectors for training by referring to one or more actual circumstances for training, corresponding thereto, included in each of one or more driving trajectories for training of the subject driver are acquired, has performed (i) a process of instructing an adjustment reward network, which is built to operate as an adjustment reward function to be used for establishing the personalized reward function from a common reward function corresponding to the common optimal policy, to generate each of one or more first adjustment rewards for training corresponding to each of the actual actions for training performed at each of the timings for training, by referring to the information on the actual actions for training and the actual circumstance vectors for training, (ii) a process of instructing a common reward module corresponding to the common reward function to generate each of one or more first common rewards for training corresponding to each of the actual actions for training performed at each of the timings for training, by referring to the information on the actual actions for training and the actual circumstance vectors for training, and (iii) a process of instructing an estimation network, which is capable of estimating sums of personalized rewards for training generated while common optimal actions for training according to the common optimal policy for training are performed based on its corresponding actual circumstances for training, to generate each of one or more actual prospective values for training corresponding to each of the actual circumstances for training at each of the timings for training in the driving trajectories for training, by referring to the actual circumstance vectors for training; and (2) the learning device has instructed a first loss layer to generate at least one adjustment reward loss by referring to (i) each of first personalized rewards for training corresponding to each of the first adjustment rewards for training and each of the first common rewards for training and (ii) the actual prospective values for training, and to perform backpropagation by referring to the adjustment reward loss, to thereby learn at least part of parameters of the adjustment reward network, instructing the adjustment reward network and the common reward module to generate a personalized reward for testing including an adjustment reward for testing and a common reward for testing by referring to (i) an actual circumstance vector for testing corresponding to a t-th timing and (ii) an actual action for testing generated by the personalized RL agent; (II) instructing the personalized RL agent to train its own parameters by referring to the personalized reward for testing.

As one example, at the process of (II), the personalized RL agent trains said its own parameters by referring to the personalized reward for testing, to thereby support the subject vehicle to drive similarly to the actual actions for training.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

FIG. 3 is a drawing schematically illustrating a flow of the learning method for supporting the RL by using the human driving data as the training data, to thereby perform the personalized path planning in accordance with one example embodiment of the present disclosure.

DETAILED DESCRIPTION OF THE PREFERRED EMBODIMENTS

Figure 1:
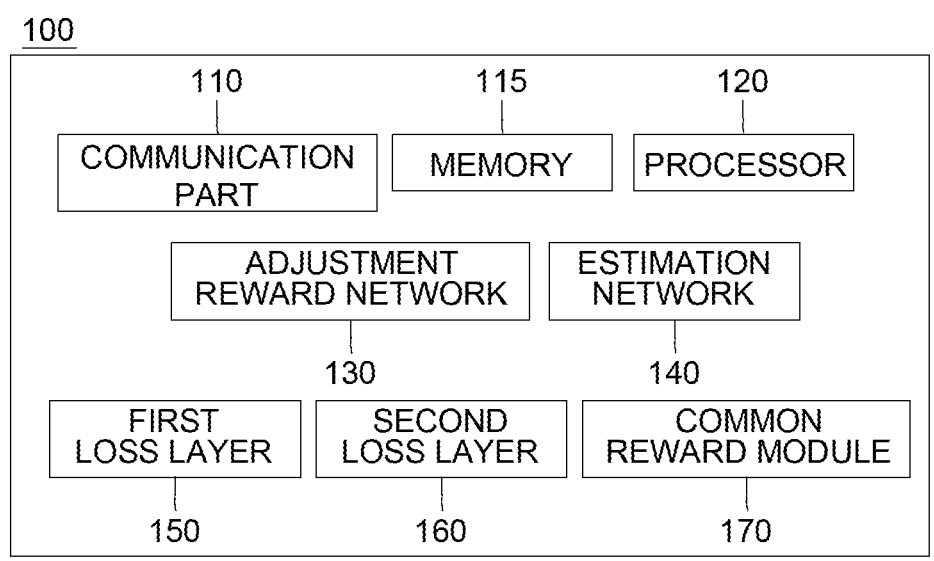
FIG. 1 is a drawing schematically illustrating a configuration of a learning device performing a learning method for supporting a Reinforcement Learning (RL) by using human driving data as training data, to thereby perform a personalized path planning in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits, and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to the present disclosure to be carried out easily, the example embodiments of the present disclosure by referring to attached drawings will be explained in detail as shown below.

For reference, in the description below, the phrase "for training" or "training" is added for terms related to the learning process, and the phrase "for testing" or "testing" is added for terms related to the testing process, to avoid possible confusion.

FIG. 1 is a drawing schematically illustrating a configuration of a learning device performing a learning method for a reinforcement learning by using human driving data as training data, to thereby perform a personalized path planning in accordance with one example embodiment of the present disclosure.

By referring to FIG. 1, the learning device may include an adjustment reward network 130, an estimation network 140, a first loss layer 150, a second loss layer 160 and a common reward module 170 to be described later. Processes of input/output and computations of the adjustment reward network 130, the estimation network 140, the first loss layer 150, the second loss layer 160 and the common reward module 170 may be respectively performed by at least one communication part 110 and at least one processor 120. However, detailed communication schematics between the communication part 110 and the processor 120 are omitted in FIG. 1. Herein, a memory 115 may have stored various instructions to be described later, and the processor 120 may execute the instructions stored in the memory 115 and may perform processes of the present disclosure by executing the instructions to be disclosed later. Such description of the learning device 100 does not exclude an integrated device including any combination of a processor, a memory, a medium, or any other computing components.

The adjustment reward network 130 and the estimation network 140 may include each of multiple layers including virtual neurons which acquire their inputs from their previous virtual neurons, process the inputs, and deliver their outputs to their next virtual neurons. To be simple, the adjustment reward network 130 and the estimation network 140 may have structures similar to those of well-known Feed-Forward networks.

So far the configuration of the learning device 100 performing the learning method of the present disclosure has been explained. Below, the learning method itself will be explained, but before that, general explanation on backgrounds thereof will be provided.

First, as generally known, the RL algorithm is a scheme that an RL agent is trained by (i) selecting a specific action based on a specific circumstance, (ii) acquiring a specific reward for the specific action by using a reward function assigned to the RL agent, and (iii) performing backpropagation or other training schemes by using the specific reward. In order to acquire a proper output, a programmer should establish the reward function properly, since the reward function is a key for training the RL agent.

On this basis, a common optimal policy may be an autonomous driving scheme established according to a common criterion. And, a common reward function may be a reward function for training the RL agent to perform the autonomous driving according to the common optimal policy.

On the other hand, a personalized optimal policy may be an autonomous driving scheme established for a subject driver. And, a personalized reward function may be reward function for training the RL agent to perform the autonomous driving according to the personalized optimal policy.

In this regard, the present disclosure is directed to a goal of providing the personalized reward function corresponding to the personalized optimal policy for the autonomous driving, by slightly adjusting the common reward function, using an adjustment reward function. Such relationship may be as shown below:

$$R_p = R_{common} + R_{driver}$$

In the formula, $R_{common}$ may denote an output of the common reward module 170 performing the common reward function corresponding to the common optimal policy for the autonomous driving, $R_{driver}$ may denote an output of the adjustment reward network 130 performing the adjustment reward function, $R_p$ may denote an output of the personalized reward function, acquired by using the common reward module 170 and the adjustment reward network 130 together.

Herein, the common reward function 170 may be given as a rule-set from the beginning, and the adjustment reward network 130 may be given as untrained at first, and may be trained by performing the learning method of the present disclosure. Someone may think that it may be possible to build a singular neural network performing the personalized reward function for the personalized optimal policy, not like the present disclosure using two components, i.e., the adjustment reward network 130 and the common reward module 170. However, the personalized reward function cannot be performed by using the singular neural network, because a solution of the personalized reward function is not unique, and too much training data, i.e., driving trajectories to be explained later, is required to train the singular neural network. Thus, the personalized reward function may be performed by using both the common reward module 170 and the adjustment reward network 130.

Additional information on the common reward module 170 and the common optimal policy will be presented below. That is, the common reward module 170 may have been acquired by analyzing each of the driving trajectories of drivers including information on each of circumstances and information on actions of each of the drivers in each of the circumstances. For example, an annotator may determine whether each of the actions in the each of the driving trajectories caused accidents or not, may set each of rewards for each of the actions, may set a rule-set derived from relationships between said rewards and said actions as the common reward function, and may build a module including the rule-set as the common reward module 170. Such common reward module 170 may be used for supporting a training process of the RL agent to which the driving trajectories are inputted as the training data. As a result, the RL agent may become capable of performing the autonomous driving by referring to the common optimal policy.

Herein, the common reward function performed by the common reward module 170 may be expressed as a following formula:

$$R_{common}(S, A, S_{next})$$

Herein, S may denote one of the circumstances at each of timings in one of the driving trajectories, A may denote an action performed at its corresponding timing, and $S_{next}$ may denote its next one of the circumstances caused by the action. The adjustment reward function may be noted as similarly to the common reward function.

The driving trajectories mentioned so far may correspond to a plurality of people, thus may have been used for acquiring the common optimal policy. In the present disclosure, some of the driving trajectories, which correspond to a single person, i.e., the subject driver, will be used, because the present disclosure is directed to a method for acquiring the "personalized" optimal policy, not the "common" optimal policy. Accordingly, "driving trajectories" to be mentioned below all correspond to the single person, i.e., the subject driver.

Herein, the driving trajectories for the subject driver may include information on one or more actual circumstance vectors and one or more actual actions performed at timings corresponding to the actual circumstance vectors by referring to the one or more actual circumstances corresponding thereto. To be explained later, additional information, i.e., virtual circumstance vectors which include information on each of virtual circumstances caused by virtually performing common optimal actions, not the actual actions, can be used along with the driving trajectories, at each of the timings of the driving trajectories. Herein, the actual circumstance vectors may include information on surroundings of the subject vehicle at their corresponding timings, such as information on locations of surrounding objects and their classes, or information on segmentation images. In order to take a look at such driving trajectories and the additional information, FIG. 2 will be referred to.

Figure 2:
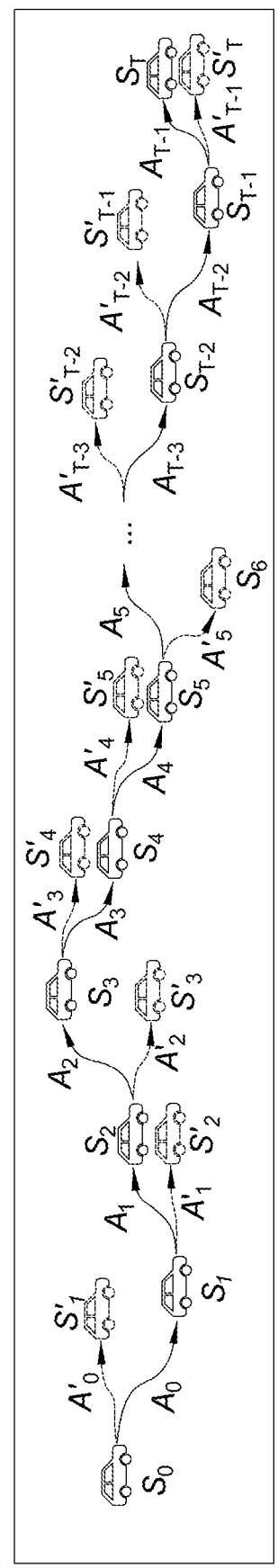
FIG. 2 is a drawing schematically illustrating an example of driving trajectories used for performing the learning method for supporting the RL by using the human driving data as the training data, to thereby perform the personalized path planning in accordance with one example embodiment of the present disclosure.

FIG. 2 is a drawing schematically illustrating an example of driving trajectories used for performing the learning method for supporting the RL by using the human driving data as the training data, to thereby perform the personalized path planning in accordance with one example embodiment of the present disclosure.

By referring to FIG. 2, notations s, a, s' and a' for circles and arrows can be seen. Herein, each of s and a may denote each of the actual circumstance vectors and each of the actual actions, and each of s' and a' may denote each of the virtual circumstance vectors and their corresponding common optimal actions. More specifically, s' may denote each of the virtual circumstance vectors caused by performing each of the common optimal actions a', not the actual actions a, at each of states corresponding to each of the actual circumstance vectors s.

Herein, how the common optimal actions and the virtual circumstance vectors can be acquired will be explained. First, the common optimal actions can be acquired from the RL agent including the common optimal policy, by inputting the actual circumstance vectors in the driving trajectories to the RL agent. The virtual circumstance vectors may be acquired by using an additional operation, i.e., a circumstance expectation operation. And the circumstance expectation operation may be performed in two ways.

First, the virtual circumstance vectors may be acquired by using a pre-trained circumstance expectation network. The circumstance expectation network may include each of multiple layers including multiple neurons. Such circumstance expectation network may acquire circumstance vectors for training and their corresponding actions for training as its training data, may output estimated next circumstance vectors for training, and may generate a loss by using the estimated next circumstance vectors for training and their corresponding Ground-Truth (GT) next circumstance vectors including information on circumstances caused by the actions for training in circumstances corresponding to the circumstance vectors for training. Then, the circumstance expectation network may perform backpropagation by using the loss, to thereby learn parameters thereof. Such training processes may be similar to those of a general Feed-Forward Network, thus a person in the art may be able to understand above explanations easily.

Otherwise, the virtual circumstance vectors can be acquired by using a virtual world simulator. That is, the circumstance estimation operation may be performed by instructing the virtual world simulator to simulate a specific actual circumstance corresponding to a specific actual circumstance vector in a virtual world, instructing a virtual vehicle in the specific actual circumstance to perform one of the common optimal actions according to the common optimal policy, and detecting changes of the virtual world caused by said one of the common optimal actions, to thereby acquire the virtual circumstance vectors.

The estimation network 140 will be explained briefly below. The estimation network 140 may acquire a specific circumstance vector corresponding to a specific timing as its input, and may output an estimated sum of personalized rewards, if the common optimal actions are continuously performed, to be generated from the specific timing to a final timing of its corresponding driving trajectory.

By referring to general and brief explanations provided above, the learning method of the present disclosure will be explained by referring to FIG. 3.

FIG. 3 is a drawing schematically illustrating a flow of the learning method for supporting the RL by using the human driving data as the training data, to thereby perform the personalized path planning in accordance with one example embodiment of the present disclosure.

By referring to FIG. 3, at a step of S00, the learning device 100 may acquire the actual circumstance vectors and information on the actual actions performed at the timings corresponding to the actual circumstance vectors by referring to the actual circumstances, included in each of the driving trajectories of the subject driver. And, at a step of S01-1, the learning device 100 may instruct the adjustment reward network 130 to generate each of one or more first adjustment rewards by referring to the information on the actual actions and the actual circumstance vectors. Also, in parallel, at a step of S01-2, the learning device 100 may instruct the common reward module 170 to generate each of one or more first common rewards by referring to the information on the actual actions and the actual circumstance vectors. Further, also in parallel, at a step of S01-3, the learning device 100 may instruct the estimation network 140 to generate each of one or more actual prospective values by referring to the actual circumstance vectors.

Thereafter, at a step of S02, the learning device 100 may instruct the first loss layer 150 to generate at least one adjustment reward loss by referring to (i) each of first personalized rewards corresponding to each of the first adjustment rewards and each of the first common rewards and (ii) the actual prospective values. Then, at a step of S03, the learning device 100 may instruct the first loss layer 150 to perform backpropagation by referring to the adjustment reward loss, to thereby learn at least part of parameters of the adjustment reward network 130.

More specifically, each of the first adjustment rewards, generated at the step of S01-1, may be each of adjustment rewards corresponding to each of the actual actions performed at each of the timings. It was noted as the "first" adjustment rewards to distinguish those from other adjustment rewards, e.g., second adjustment rewards to be used for training the estimation network 140.

Also, each of the first common rewards may be each of common rewards corresponding to each of the actual actions performed at each of the timings. It was also noted as the "first" common rewards to distinguish those from other common rewards, e.g., second common rewards to be used for training the estimation network 140.

Such first adjustment rewards and such first common rewards may be summed up correspondingly to generate the first personalized rewards. By summing up those two kinds of rewards, the scheme of the present disclosure as shown below, which is adjusting the common reward function to generate the personalized reward function, can be fulfilled.

And, the actual prospective values may be values on personalized rewards corresponding to each of the common optimal actions performed in each of the actual circumstances at each of the timings. As an example, the actual prospective values may be sums of such personalized rewards.

Below, how the adjustment reward loss can be generated by referring to the first personalized rewards and the actual prospective values will be explained, by referring to a following formula.

$$E(R_{driver}) = \sum_{\mathcal{T}_1, \mathcal{T}_2, \ldots, \mathcal{T}_N} \left\{ \sum_{t=0}^{T-1} \max\left(0, V_{common}(s_t) - \sum_{r=t}^{T-1} \gamma^{r-t}(R_{common}(s_r, a_r, s_{r+1}) + R_{driver}(s_r, a_r, s_{r+1}))\right) \right\} + \alpha \sum_{\mathcal{T}_1, \mathcal{T}_2, \ldots, \mathcal{T}_N} \sum_{t=0}^{T-1} |R_{driver}(s_r, a_r, s_{r+1})|$$

In the formula, $\mathcal{T}_1, \mathcal{T}_2, \ldots, \mathcal{T}_N$ may denote a first driving trajectory to an N-th driving trajectory in the driving trajectories, $V_{common}(s_t)$ may denote a specific actual prospective value, among the actual prospective values, corresponding to a sum of personalized rewards generated while the common optimal actions according to the common optimal policy are performed from a t-th timing to a final timing of a specific driving trajectory among the driving trajectories. Also, $R_{common}(s_r, a_r, s_{r+1}) + R_{driver}(s_r, a_r, s_{r+1})$ may denote a first specific personalized reward, among the first personalized rewards, corresponding to an r-th timing same as or after the t-th timing in the specific driving trajectory, $\Sigma_{t=0}^{T-1} |R_{driver}(s_r, a_r, s_{r+1})|$ may denote a sum of absolute values of first specific adjustment rewards, among the first adjustment rewards, generated during a time range from an initial timing to the final timing of the specific driving trajectory. And, $\gamma$ and $\alpha$ may denote prescribed constants.

More specifically, the max operation is built as shown above to (i) compare the specific actual prospective value $V_{common}(s_t)$ which represents a sum of personalized rewards generated when the common optimal rewards are performed and its corresponding sum of personalized rewards, $\Sigma_{r=t}^{T-1} \gamma^{r-t}(R_{common}(s_r, a_r, s_{r+1}) + R_{driver}(s_r, a_r, s_{r+1}))$, generated when the actual actions are performed at the same time, and (ii) output 0 if the latter one is larger, and output a difference between the former one and the latter one in the opposite case. Since the personalized reward network 130 should be trained to reflect preferences of the subject driver on its parameters, larger gradients should be applied to the parameters of the adjustment reward network if personalized rewards for the common optimal actions have been calculated larger than those for the actual actions. In this regard, the two kinds of personalized rewards are compared.

A latter part of the formula for the adjustment reward loss without the max function has been added to prevent the first adjustment rewards from becoming too large. The adjustment reward should be prevented from becoming too large, because, if it becomes too large, the personalized rewards may be overfitted to the subject driver. If the adjustment reward loss excludes the latter part, the adjustment reward network 140 may be trained to generate the adjustment rewards, and further personalized rewards, larger when its corresponding RL agent performs similarly only to the actual actions. Thus, to prevent the overfitting, the sum of absolute values of first specific adjustment rewards, among the first adjustment rewards is added to the adjustment reward loss.

As the adjustment reward loss is generated, the first loss layer 150 may perform the backpropagation by using the adjustment reward loss, to learn the parameters thereof.

Thereafter, the learning device 100 may perform training process of the estimation network 140. Below, it will be explained.

That is, the learning device 100 may instruct the adjustment reward network 130 to generate one or more second adjustment rewards by referring to the actual circumstance vectors. And, in parallel, the learning device 100 may instruct the common reward module 170 to generate one or more second common rewards by referring to the actual circumstance vectors. Also, in parallel, the learning device 100 may instruct the estimation network 140 to generate one or more virtual prospective values corresponding to the virtual circumstances by referring to each of the virtual circumstance vectors. Then, the learning device 100 may instruct the second loss layer 160 to generate at least one estimation loss by referring to (i) each of second personalized rewards corresponding to each of the second adjustment rewards and each of the second common rewards, (ii) the virtual prospective values and (iii) the actual prospective values, and to perform backpropagation by referring to the estimation loss, to thereby learn at least part of parameters of the estimation network 140.

Herein, the second adjustment rewards may represent adjustment rewards corresponding to each of the common optimal actions to be performed at each of the timings of the driving trajectories. Different from the first ones, second ones are for the common optimal actions, not for the actual actions. Also, the second common rewards may represent common rewards corresponding to each of the common optimal actions to be performed at each of the timings of the driving trajectories. Those are also for the common optimal actions, not the actual actions, different from the first ones. Therefore, the second personalized rewards generated by correspondingly summing up the second adjustment rewards and the second common rewards may correspond to personalized rewards for the common optimal actions, not the actual actions. The reason why such second personalized rewards for the "common" optimal actions are used is that the estimation network 140 is a network which estimates a sum of personalized rewards generated for the common optimal actions. Thus the second personalized rewards for the common optimal actions are used as the training data.

By referring to the above explanation, how the estimation loss can be generated by using the second personalized rewards, the virtual prospective values and the actual prospective values will be explained, by referring to a following formula.

$$E(V_{common}) = \sum_{T_1, T_2, \ldots, T_N} \sum_{t=1}^{T-1} (R_{common}(s_t, a'_t, s'_{t+1}) + R_{driver}(s_t, a'_t, s'_{t+1}) + \gamma V_{common}(s'_{t+1}) - V_{common}(s_t))^2$$

Herein, $T_1, T_2, \ldots, T_N$ may denote a first driving trajectory to an N-th driving trajectory in the driving trajectories and $V_{common}(s_t)$ may denote a specific actual prospective value, among the actual prospective values, corresponding to a sum of personalized rewards generated while the common optimal actions according to the common optimal policy are performed from a t-th timing to a final timing of a specific driving trajectory among the driving trajectories. Also, $V_{common}(s'_{t+1})$ may denote a specific virtual prospective value, among the virtual prospective values, corresponding to a sum of personalized rewards generated while the common optimal actions according thereto are performed from a (t+1)-th timing to the final timing based on a specific virtual circumstance caused by performing one of the common optimal actions at the t-th timing and $R_{common}(s_t, a'_t, s'_{t+1}) + R_{driver}(s_t, a'_t, s'_{t+1})$ may denote a second specific personalized reward, among the second personalized rewards, corresponding to the t-th timing, and $\gamma$ denotes a prescribed constant.

More specifically, both $R_{common}(s_t, a'_t, s'_{t+1}) + R_{driver}(s_t, a'_t, s'_{t+1}) + \gamma V_{common}(s'_{t+1})$ and $V_{common}(s_t)$ may denote a sum of personalized rewards generated during a time range from the t-th timing to the final timing. However, the latter one is a result of the estimation network 140 directly estimating the sum of the personalized rewards generated during the time range from the t-th timing to the final timing, and the former one is a sum of (i) a personalized reward for one of the common optimal actions performed at the t-th timing, generated by the adjustment reward network 130 and the common reward module 170 and (ii) an output of the estimation network 140 estimating a sum of personalized rewards generated during a time range from a (t+1)-th timing to the final timing when said one of the common optimal actions is performed at the t-th timing. It can be said that the former one is more accurate than the latter one, because, actually, the estimation network 140 estimates a sum of outputs of the adjustment reward network 130 and the common reward module 170 when the common optimal actions are performed. More specifically, said latter one includes an estimated sum of the outputs of the adjustment reward network 130 and the common reward module 170 for the t-th timing, and said former one includes a real sum of real outputs of the adjustment reward network 130 and the common reward module 170, not the estimated sum like the latter one, thus the former one is more accurate. Therefore, if the estimation network 140 has not been properly trained, a difference between the former one and the latter one will be large, and vice versa. The estimation loss formula was built as shown above to reflect such relationship between the difference and a properness of the estimation network 140 on the estimation loss. Above training process is similar to that using a Markov Decision Process scheme, thus a person in the art will be able to understand the training process easily, by referring to the above explanations.

So far the training processes of the adjustment reward network 130 and the estimation network 140 have been explained. As seen in the training processes, those two networks need each other to train themselves. That is, when training the adjustment reward network 130, the actual prospective values, which are outputs of the estimation network 140, are needed, and when training the estimation network 140, the second adjustment rewards, which are outputs of the adjustment reward network 130, are needed. Thus, the two networks can be trained in turns. That is, the adjustment reward network 130 may be trained first, then the estimation network 140 may be trained, again the adjustment reward network 130 may be trained, still again the estimation network 140 may be trained, and so on. It has been illustrated that the adjustment reward network 130 is trained earlier than the estimation network 140, but such order is not an essential one, thus the estimation network 140 may be trained first.

Herein, the training data, i.e., the driving trajectories for the subject driver, used for training the two networks, may have been provided to the learning device 100 as a mini batch by (i) transmitting a query to a database, (ii) randomly sampling the driving trajectories from a driving trajectory group corresponding to the subject driver in the database, and (iii) delivering those to the learning device 100.

In the above explanations, it has been explained that the same mini batch is used for training both the adjustment reward network 130 and the estimation network 140, but a scope of the present disclosure may not be limited thereto. That is, each of different mini batches may be selected for each of the training processes of each of the two networks. Such tweak on the method of the present disclosure will be obvious for a person in the art, thus such embodiment is included in the scope of the present disclosure.

So far the learning method of the present disclosure has been explained. Below, a testing method of the present disclosure will be explained.

First, on condition that (1) the learning device 100, if one or more actual circumstance vectors for training and information on one or more actual actions for training performed at timings for training corresponding to the actual circumstance vectors for training by referring to one or more actual circumstances for training, corresponding thereto, included in each of one or more driving trajectories for training of the subject driver are acquired, has performed (i) a process of instructing the adjustment reward network 130, which is built to operate as an adjustment reward function to be used for establishing the personalized reward function from a common reward function corresponding to the common optimal policy, to generate each of one or more first adjustment rewards for training corresponding to each of the actual actions for training performed at each of the timings for training, by referring to the information on the actual actions for training and the actual circumstance vectors for training, (ii) a process of instructing the common reward module 170 corresponding to the common reward function to generate each of one or more first common rewards for training corresponding to each of the actual actions for training performed at each of the timings for training, by referring to the information on the actual actions for training and the actual circumstance vectors for training, and (iii) a process of instructing the estimation network 140, which is capable of estimating sums of personalized rewards for training generated while common optimal actions for training according to the common optimal policy for training are performed based on its corresponding actual circumstances for training, to generate each of one or more actual prospective values for training corresponding to each of the actual circumstances for training at each of the timings for training in the driving trajectories for training, by referring to the actual circumstance vectors for training; and (2) the learning device 100 has instructed the first loss layer 150 to generate at least one adjustment reward loss by referring to (i) each of first personalized rewards for training corresponding to each of the first adjustment rewards for training and each of the first common rewards for training and (ii) the actual prospective values for training, and to perform backpropagation by referring to the adjustment reward loss, to thereby learn at least part of parameters of the adjustment reward network, a testing device may instruct the adjustment reward network 130 and the common reward module 170 to generate a personalized reward for testing including an adjustment reward for testing and a common reward for testing by referring to (i) an actual circumstance vector for testing corresponding to a t-th timing and (ii) an actual action for testing generated by the personalized RL agent.

Then, the testing device may instruct the personalized RL agent to train its own parameters by referring to the personalized reward for testing. How the RL agent uses the personalized reward function established by the common reward module 170 and the adjustment reward network 130 may be similar to that of conventional arts on the RL, thus more explanation is omitted.

By using the personalized reward for testing to train the personalized RL agent, the subject vehicle may become capable of driving similarly to the actual actions for training, to thereby provide a driver-specific better driving experience to the subject driver autonomously.

It is an advantage of the present disclosure to provide a learning method for supporting a Reinforcement Learning (RL) algorithm by using human driving data as training data, to thereby provide a personalized path planning, and then to thereby provide a satisfied driving experience to passengers of an autonomous vehicle. And, it is another advantage of the present disclosure to provide a personalized reward function to be used for supporting the RL algorithm, by using the human driving data as the training data, to thereby provide the personalized path planning. Further, it is still another advantage of the present disclosure to provide a method for acquiring the personalized reward function by adjusting a common reward function to reduce usage of computing resources.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for acquiring at least one personalized reward function, used for performing a Reinforcement Learning (RL) algorithm, corresponding to a personalized optimal policy for a subject driver which is acquired by adjusting a common optimal policy established according to a common criterion for an autonomous driving, to thereby support the autonomous driving of a subject vehicle, comprising:

(a) a learning device, if one or more actual circumstance vectors and information on one or more actual actions performed at timings corresponding to the actual circumstance vectors by referring to one or more actual circumstances, corresponding thereto, included in each of one or more driving trajectories of the subject driver are acquired,
  (i) instructing an adjustment reward network, which is built to operate as an adjustment reward function to be used for establishing the personalized reward function from a common reward function corresponding to the common optimal policy, to generate each of one or more first adjustment rewards corresponding to each of the actual actions performed at each of the timings, by referring to the information on the actual actions and the actual circumstance vectors,
  (ii) instructing a common reward module corresponding to the common reward function to generate each of one or more first common rewards corresponding to each of the actual actions performed at each of the timings, by referring to the information on the actual actions and the actual circumstance vectors, and
  (iii) instructing an estimation network, which is capable of estimating sums of personalized rewards generated while common optimal actions according to the common optimal policy are performed based on its corresponding actual circumstances, to generate each of one or more actual prospective values corresponding to each of the actual circumstances at each of the timings in the driving trajectories, by referring to the actual circumstance vectors; and
(b) the learning device instructing a first loss layer to generate at least one adjustment reward loss by referring to
  (i) each of first personalized rewards corresponding to each of the first adjustment rewards and each of the first common rewards and
  (ii) the actual prospective values, and to perform backpropagation by referring to the adjustment reward loss, to thereby learn at least part of parameters of the adjustment reward network;

wherein, at (b), the learning device instructs the first loss layer to generate the adjustment reward loss by referring to a following formula:

$$E(R_{driver}) = \sum_{T_1,T_2,\ldots,T_N} \sum_{t=0}^{T-1} \max\left(0, V_{common}(s_t) - \sum_{r=t}^{T-1} \gamma^{r-t}(R_{common}(s_r, a_r, s_{r+1}) + R_{driver}(s_r, a_r, s_{r+1}))\right) + \alpha \sum_{T_1,T_2,\ldots,T_N} \sum_{t=0}^{T-1} |R_{driver}(s_r, a_r, s_{r+1})|$$

wherein $T_1, T_2, \ldots T_N$ denote a first driving trajectory to an N-th driving trajectory in the driving trajectories, $V_{common}(S_t)$ denotes a specific actual prospective value, among the actual prospective values, corresponding to a sum of personalized rewards generated while the common optimal actions according to the common optimal policy are performed from a t-th timing to a final timing of a specific driving trajectory among the driving trajectories, $R_{common}(s_r, a_r, s_{r+1}) + R_{driver}(s_r, a_r, s_{r+1})$ denotes a first specific personalized reward, among the first personalized rewards, corresponding to an r-th timing same as or after the t-th timing in the specific driving trajectory, $\Sigma_{t=0}^{T-1}|R_{driver}(s_r, a_r, s_{r+1})|$ denotes a sum of absolute values of first specific adjustment rewards, among the first adjustment rewards, generated during a time range from an initial timing to the final timing of the specific driving trajectory, and $\gamma$ and $\alpha$ denote prescribed constants.

2. A learning method for acquiring at least one personalized reward function, used for performing a Reinforcement Learning (RL) algorithm, corresponding to a personalized optimal policy for a subject driver which is acquired by adjusting a common optimal policy established according to a common criterion for an autonomous driving, to thereby support the autonomous driving of a subject vehicle, comprising:

(a) a learning device, if one or more actual circumstance vectors and information on one or more actual actions performed at timings corresponding to the actual circumstance vectors by referring to one or more actual circumstances, corresponding thereto, included in each of one or more driving trajectories of the subject driver are acquired,
  (i) instructing an adjustment reward network, which is built to operate as an adjustment reward function to be used for establishing the personalized reward function from a common reward function corresponding to the common optimal policy, to generate each of one or more first adjustment rewards corresponding to each of the actual actions performed at each of the timings, by referring to the information on the actual actions and the actual circumstance vectors,
  (ii) instructing a common reward module corresponding to the common reward function to generate each of one or more first common rewards corresponding to each of the actual actions performed at each of the timings, by referring to the information on the actual actions and the actual circumstance vectors, and
  (iii) instructing an estimation network, which is capable of estimating sums of personalized rewards generated while common optimal actions according to the common optimal policy are performed based on its corresponding actual circumstances, to generate each of one or more actual prospective values corresponding to each of the actual circumstances at each of the timings in the driving trajectories, by referring to the actual circumstance vectors;
(b) the learning device instructing a first loss layer to generate at least one adjustment reward loss by referring to
    (i) each of first personalized rewards corresponding to each of the first adjustment rewards and each of the first common rewards and
    (ii) the actual prospective values, and to perform backpropagation by referring to the adjustment reward loss, to thereby learn at least part of parameters of the adjustment reward network;
(c) the learning device
    (i) instructing the adjustment reward network to generate one or more second adjustment rewards corresponding to each of the common optimal actions to be performed at each of the timings of the driving trajectories by referring to the actual circumstance vectors,
    (ii) instructing the common reward module to generate one or more second common rewards corresponding to each of the common optimal actions to be performed at each of the timings of the driving trajectories by referring to the actual circumstance vectors, and
    (iii) instructing the estimation network, by referring to each of one or more virtual circumstance vectors corresponding to each of virtual circumstances caused by performing the common optimal actions at each of the timings of the driving trajectories, to generate one or more virtual prospective values corresponding to the virtual circumstances; and
(d) the learning device instructing a second loss layer to generate at least one estimation loss by referring to
    (i) each of second personalized rewards corresponding to each of the second adjustment rewards and each of the second common rewards,
    (ii) the virtual prospective values, and
    (iii) the actual prospective values, and to perform backpropagation by referring to the estimation loss, to thereby learn at least part of parameters of the estimation network.

3. The method of claim 2, wherein, at (d), the learning device instructs the second loss layer to generate the estimation loss by referring to a following formula:

$$E(V_{common}) = \sum_{T_1, T_2, \ldots, T_N} \sum_{t=1}^{T-1} (R_{common}(s_t, a'_t, s'_{t+1}) + R_{driver}(s_t, a'_t, s'_{t+1}) + \gamma V_{common}(s'_{t+1}) - V_{common}(s_t))^2$$

wherein $T_1, T_2, \ldots, T_N$ denote a first driving trajectory to an N-th driving trajectory in the driving trajectories, $V_{common}(s_t)$ denotes a specific actual prospective value, among the actual prospective values, corresponding to a sum of personalized rewards generated while the common optimal actions according to the common optimal policy are performed from a t-th timing to a final timing of a specific driving trajectory among the driving trajectories, $V_{common}(S'_{t+1})$ denotes a specific virtual prospective value, among the virtual prospective values, corresponding to a sum of personalized rewards generated while the common optimal actions according thereto are performed from a (t+1)-th timing to the final timing based on a specific virtual circumstance caused by performing one of the common optimal actions at the t-th timing, $R_{common}(s_t, a'_t, s'_{t+1}) + R_{driver}(s_t, a'_t, s'_{t+1})$ denotes a second specific personalized reward, among the second personalized rewards, corresponding to the t-th timing, and $\gamma$ denotes a prescribed constant.

4. The method of claim 2, wherein the virtual circumstance vectors are acquired by applying a circumstance estimation operation to each of at least part of the actual circumstance vectors and its corresponding common optimal action corresponding to the common optimal policy,
wherein the circumstance estimation operation is performed by a pre-trained circumstance expectation network or performed by
    (i) instructing a virtual world simulator to simulate a specific actual circumstance corresponding to a specific actual circumstance vector in a virtual world,
    (ii) instructing a virtual vehicle in the specific actual circumstance to perform one of the common optimal actions according to the common optimal policy, and
    (iii) detecting changes of the virtual world caused by said one of the common optimal actions.

5. The method of claim 2, wherein the learning device repeats a first process of training the adjustment reward network corresponding to (a) and (b), and a second process of training the estimation network corresponding to (c) and (d), to thereby fully train the adjustment reward network and the estimation network.

6. The method of claim 1, wherein the driving trajectories are provided to the learning device as a mini batch generated by randomly sampling the driving trajectories from a driving trajectory group corresponding to the subject driver.

7. The method of claim 1, wherein the common optimal actions according to the common optimal policy are determined by a general RL agent optimized by performing the RL algorithm using the common reward module corresponding to the common optimal policy.

8. A method for using at least one personalized reward function to train a personalized Reinforcement Learning (RL) agent, corresponding to a personalized optimal policy for a subject driver which is acquired by adjusting a common optimal policy established according to a common criterion for an autonomous driving, to thereby support the autonomous driving of a subject vehicle, comprising:
(a) on condition that
    (1) a learning device, if one or more actual circumstance vectors for training and information on one or more actual actions for training performed at timings for training corresponding to the actual circumstance vectors for training by referring to one or more actual circumstances for training, corresponding thereto, included in each of one or more driving trajectories for training of the subject driver are acquired, has
        (i) instructed an adjustment reward network, which is built to operate as an adjustment reward function to be used for establishing the personalized reward function from a common reward function corresponding to the common optimal policy, to generate each of one or more first adjustment rewards for training corresponding to each of the actual actions for training performed at each of the timings for training, by referring to the information on the actual actions for training and the actual circumstance vectors for training,
        (ii) instructed a common reward module corresponding to the common reward function to generate each of one or more first common rewards for training corresponding to each of the actual actions for training performed at each of the timings for training, by referring to the information on the actual actions for training and the actual circumstance vectors for training, and
(iii) instructed an estimation network, which is capable of estimating sums of personalized rewards for training generated while common optimal actions for training according to the common optimal policy for training are performed based on its corresponding actual circumstances for training, to generate each of one or more actual prospective values for training corresponding to each of the actual circumstances for training at each of the timings for training in the driving trajectories for training, by referring to the actual circumstance vectors for training;
(2) the learning device has instructed a first loss layer to generate at least one adjustment reward loss by referring to
(i) each of first personalized rewards for training corresponding to each of the first adjustment rewards for training and each of the first common rewards for training, and
(ii) the actual prospective values for training, and to perform backpropagation by referring to the adjustment reward loss, to thereby learn at least part of parameters of the adjustment reward network;
(3) the learning device has
(i) instructed the adjustment reward network to generate one or more second adjustment rewards corresponding to each of the common optimal actions to be performed at each of the timings of the driving trajectories by referring to the actual circumstance vectors,
(ii) instructed the common reward module to generate one or more second common rewards corresponding to each of the common optimal actions to be performed at each of the timings of the driving trajectories by referring to the actual circumstance vectors, and
(iii) instructed the estimation network, by referring to each of one or more virtual circumstance vectors corresponding to each of virtual circumstances caused by performing the common optimal actions at each of the timings of the driving trajectories, to generate one or more virtual prospective values corresponding to the virtual circumstances; and
(4) the learning device has instructed a second loss layer to generate at least one adjustment reward loss by referring to
(i) each of second personalized rewards corresponding to each of the second adjustment rewards and each of the second common rewards,
(ii) the virtual prospective values, and
(iii) the actual prospective values, and to perform backpropagation by referring to the estimation loss, to thereby learn at least part of parameters of the estimation network,
a testing device instructing the adjustment reward network and the common reward module to generate a personalized reward for testing including an adjustment reward for testing and a common reward for testing by referring to
(i) an actual circumstance vector for testing corresponding to a t-th timing, and (ii) an actual action for testing generated by the personalized RL agent; and
(b) the testing device instructing the personalized RL agent to train its own parameters by referring to the personalized reward for testing.

9. The method of claim 8, wherein, at (b), the personalized RL agent trains said its own parameters by referring to the personalized reward for testing, to thereby support the subject vehicle to perform the actual actions for training.

10. A learning device for acquiring at least one personalized reward function, used for performing a Reinforcement Learning (RL) algorithm, corresponding to a personalized optimal policy for a subject driver which is acquired by adjusting a common optimal policy established according to a common criterion for an autonomous driving, to thereby support the autonomous driving of a subject vehicle, comprising:
at least one memory that stores instructions; and
at least one processor configured to execute the instructions to:
(I) if one or more actual circumstance vectors and information on one or more actual actions performed at timings corresponding to the actual circumstance vectors by referring to one or more actual circumstances, corresponding thereto, included in each of one or more driving trajectories of the subject driver are acquired,
(i) instruct an adjustment reward network, which is built to operate as an adjustment reward function to be used for establishing the personalized reward function from a common reward function corresponding to the common optimal policy, to generate each of one or more first adjustment rewards corresponding to each of the actual actions performed at each of the timings, by referring to the information on the actual actions and the actual circumstance vectors,
(ii) instruct a common reward module corresponding to the common reward function to generate each of one or more first common rewards corresponding to each of the actual actions performed at each of the timings, by referring to the information on the actual actions and the actual circumstance vectors, and
(iii) instruct an estimation network, which is capable of estimating sums of personalized rewards generated while common optimal actions according to the common optimal policy are performed based on its corresponding actual circumstances, to generate each of one or more actual prospective values corresponding to each of the actual circumstances at each of the timings in the driving trajectories, by referring to the actual circumstance vectors; and
(II) instruct a first loss layer to generate at least one adjustment reward loss by referring to
(i) each of first personalized rewards corresponding to each of the first adjustment rewards and each of the first common rewards, and
(ii) the actual prospective values, and to perform backpropagation by referring to the adjustment reward loss,
to thereby learn at least part of parameters of the adjustment reward network;
wherein, at (II), the processor instructs the first loss layer to generate the adjustment reward loss by referring to a following formula:

$$E(R_{driver}) = \sum_{T_1, T_2, \ldots, T_N} \sum_{t=0}^{T-1} \max\left(0, V_{common}(s_t) - \sum_{r=t}^{T-1} \gamma^{r-t}(R_{common}(s_r, a_r, s_{r+1}) + R_{driver}(s_r, a_r, s_{r+1}))\right) +$$

$$\alpha \sum_{T_1, T_2, \ldots, T_N} \sum_{t=0}^{T-1} |R_{driver}(s_r, a_r, s_{r+1})|$$

wherein $T_1, T_2, \ldots, T_N$ denote a first driving trajectory to an N-th driving trajectory in the driving trajectories, $V_{common}(S_t)$ denotes a specific actual prospective value, among the actual prospective values, corresponding to a sum of personalized rewards generated while the common optimal actions according to the common optimal policy are performed from a t-th timing to a final timing of a specific driving trajectory among the driving trajectories, $R_{common}(s_r, a_r, s_{r+1}) + R_{driver}(s_r, a_r, s_{r+1})$ denotes a first specific personalized reward, among the first personalized rewards, corresponding to an r-th timing same as or after the t-th timing in the specific driving trajectory, $\Sigma_{t=0}^{T-1}|R_{driver}(s_t, a_t, s_{t+1})|$ denotes a sum of absolute values of first specific adjustment rewards, among the first adjustment rewards, generated during a time range from an initial timing to the final timing of the specific driving trajectory, and $\gamma$ and $\alpha$ denote prescribed constants.

11. A learning device for acquiring at least one personalized reward function, used for performing a Reinforcement Learning (RL) algorithm, corresponding to a personalized optimal policy for a subject driver which is acquired by adjusting a common optimal policy established according to a common criterion for an autonomous driving, to thereby support the autonomous driving of a subject vehicle, comprising:
at least one memory that stores instructions; and
at least one processor configured to execute the instructions to:
(I) if one or more actual circumstance vectors and information on one or more actual actions performed at timings corresponding to the actual circumstance vectors by referring to one or more actual circumstances, corresponding thereto, included in each of one or more driving trajectories of the subject driver are acquired,
(i) instruct an adjustment reward network, which is built to operate as an adjustment reward function to be used for establishing the personalized reward function from a common reward function corresponding to the common optimal policy, to generate each of one or more first adjustment rewards corresponding to each of the actual actions performed at each of the timings, by referring to the information on the actual actions and the actual circumstance vectors,
(ii) instruct a common reward module corresponding to the common reward function to generate each of one or more first common rewards corresponding to each of the actual actions performed at each of the timings, by referring to the information on the actual actions and the actual circumstance vectors, and
(iii) instruct an estimation network, which is capable of estimating sums of personalized rewards generated while common optimal actions according to the common optimal policy are performed based on its corresponding actual circumstances, to generate each of one or more actual prospective values corresponding to each of the actual circumstances at each of the timings in the driving trajectories, by referring to the actual circumstance vectors;
(II) instruct a first loss layer to generate at least one adjustment reward loss by referring to
(i) each of first personalized rewards corresponding to each of the first adjustment rewards and each of the first common rewards, and
(ii) the actual prospective values, and to perform backpropagation by referring to the adjustment reward loss, to thereby learn at least part of parameters of the adjustment reward network;
(III) instruct the adjustment reward network to generate one or more second adjustment rewards corresponding to each of the common optimal actions to be performed at each of the timings of the driving trajectories by referring to the actual circumstance vectors;
(IV) instruct the common reward module to generate one or more second common rewards corresponding to each of the common optimal actions to be performed at each of the timings of the driving trajectories by referring to the actual circumstance vectors;
(V) instruct the estimation network, by referring to each of one or more virtual circumstance vectors corresponding to each of virtual circumstances caused by performing the common optimal actions at each of the timings of the driving trajectories, to generate one or more virtual prospective values corresponding to the virtual circumstances; and
(VI) instruct a second loss layer to generate at least one estimation loss by referring to
(i) each of second personalized rewards corresponding to each of the second adjustment rewards and each of the second common rewards,
(ii) the virtual prospective values, and
(iii) the actual prospective values, and to perform backpropagation by referring to the estimation loss, to thereby learn at least part of parameters of the estimation network.

12. The device of claim 11, wherein, at (VI), the processor instructs the second loss layer to generate the estimation loss by referring to a following formula:

$$E(V_{common}) = \sum_{T_1, T_2, \ldots, T_N} \sum_{t=1}^{T-1} (R_{common}(s_t, a'_t, s'_{t+1}) +$$

$$R_{driver}(s_t, a'_t, s'_{t+1}) + \gamma V_{common}(s'_{t+1}) - V_{common}(s_t))^2$$

wherein $T_1, T_2, \ldots, T_N$ denote a first driving trajectory to an N-th driving trajectory in the driving trajectories, $V_{common}(S_t)$ denotes a specific actual prospective value, among the actual prospective values, corresponding to a sum of personalized rewards generated while the common optimal actions according to the common optimal policy are performed from a t-th timing to a final timing of a specific driving trajectory among the driving trajectories, $V_{common}(s'_{t+1})$ denotes a specific virtual prospective value, among the virtual prospective values, corresponding to a sum of personalized rewards generated while the common optimal actions according thereto are performed from a (t+1)-th timing to the final timing based on a specific virtual circumstance caused by performing one of the common optimal actions at the t-th timing, $R_{common}(s_t, a'_t, s'_{t+1})+R_{driver}(s_t, a'_t, s'_{t+1})$ denotes a second specific personalized reward, among the second personalized rewards, corresponding to the t-th timing, and γ denotes a prescribed constant.

13. The device of claim 11, wherein the virtual circumstance vectors are acquired by applying a circumstance estimation operation to each of at least part of the actual circumstance vectors and its corresponding common optimal action corresponding to the common optimal policy,
  wherein the circumstance estimation operation is performed by a pre-trained circumstance expectation network or performed by
    (i) instructing a virtual world simulator to simulate a specific actual circumstance corresponding to a specific actual circumstance vector in a virtual world,
    (ii) instructing a virtual vehicle in the specific actual circumstance to perform one of the common optimal actions according to the common optimal policy, and
    (iii) detecting changes of the virtual world caused by said one of the common optimal actions.

14. The device of claim 11, wherein the processor repeats a first process of training the adjustment reward network corresponding to (I) and (II), and a second process of training the estimation network corresponding to (III), of (IV), (V), and (VI), to thereby fully train the adjustment reward network and the estimation network.

15. The device of claim 10, wherein the driving trajectories are provided to the learning device as a mini batch generated by randomly sampling the driving trajectories from a driving trajectory group corresponding to the subject driver.

16. The device of claim 10, wherein the common optimal actions according to the common optimal policy are determined by a general RL agent optimized by performing the RL algorithm using the common reward module corresponding to the common optimal policy.

17. A testing device for using at least one personalized reward function to train a personalized Reinforcement Learning (RL) agent, corresponding to a personalized optimal policy for a subject driver which is acquired by adjusting a common optimal policy established according to a common criterion for an autonomous driving, to thereby support the autonomous driving of a subject vehicle, comprising:
  at least one memory that stores instructions; and
  at least one processor configured to execute the instructions to:
    (I) on condition that
      (1) a learning device, if one or more actual circumstance vectors for training and information on one or more actual actions for training performed at timings for training corresponding to the actual circumstance vectors for training by referring to one or more actual circumstances for training, corresponding thereto, included in each of one or more driving trajectories for training of the subject driver are acquired, has
        (i) instructed an adjustment reward network, which is built to operate as an adjustment reward function to be used for establishing the personalized reward function from a common reward function corresponding to the common optimal policy, to generate each of one or more first adjustment rewards for training corresponding to each of the actual actions for training performed at each of the timings for training, by referring to the information on the actual actions for training and the actual circumstance vectors for training,
        (ii) instructed a common reward module corresponding to the common reward function to generate each of one or more first common rewards for training corresponding to each of the actual actions for training performed at each of the timings for training, by referring to the information on the actual actions for training and the actual circumstance vectors for training, and
        (iii) instructed an estimation network, which is capable of estimating sums of personalized rewards for training generated while common optimal actions for training according to the common optimal policy for training are performed based on its corresponding actual circumstances for training, to generate each of one or more actual prospective values for training corresponding to each of the actual circumstances for training at each of the timings for training in the driving trajectories for training, by referring to the actual circumstance vectors for training;
      (2) the learning device has instructed a first loss layer to generate at least one adjustment reward loss by referring to
        (i) each of first personalized rewards for training corresponding to each of the first adjustment rewards for training and each of the first common rewards for training and
        (ii) the actual prospective values for training, and to perform backpropagation by referring to the adjustment reward loss, to thereby learn at least part of parameters of the adjustment reward network;
      (3) the learning device has
        (i) instructed the adjustment reward network to generate one or more second adjustment rewards corresponding to each of the common optimal actions to be performed at each of the timings of the driving trajectories by referring to the actual circumstance vectors,
        (ii) instructed the common reward module to generate one or more second common rewards corresponding to each of the common optimal actions to be performed at each of the timings of the driving trajectories by referring to the actual circumstance vectors, and
        (iii) instructed the estimation network, by referring to each of one or more virtual circumstance vectors corresponding to each of virtual circumstances caused by performing the common optimal actions at each of the timings of the driving trajectories, to generate one or more virtual prospective values corresponding to the virtual circumstances; and
      (4) the learning device has instructed a second loss layer to generate at least one adjustment reward loss by referring to (i) each of second personalized rewards corresponding to each of the second adjustment rewards and each of the second common rewards,
(ii) the virtual prospective values, and
(iii) the actual prospective values, and to perform backpropagation by referring to the estimation loss, to thereby learn at least part of parameters of the estimation network, instruct the adjustment reward network and the common reward module to generate a personalized reward for testing including an adjustment reward for testing and a common reward for testing by referring to
(i) an actual circumstance vector for testing corresponding to a t-th timing and
(ii) an actual action for testing generated by the personalized RL agent; and
(II) instruct the personalized RL agent to train its own parameters by referring to the personalized reward for testing.

18. The device of claim 17, wherein, at (II), the personalized RL agent trains said its own parameters by referring to the personalized reward for testing, to thereby support the subject vehicle to perform the actual actions for training.

* * * * *